(12) United States Patent
Lee

(10) Patent No.: US 8,558,506 B2
(45) Date of Patent: Oct. 15, 2013

(54) METHOD AND APPARATUS FOR CONTROLLING BATTERY CHARGING OF PORTABLE DEVICE

(75) Inventor: Ju Hwan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 395 days.

(21) Appl. No.: 12/967,453

(22) Filed: Dec. 14, 2010

(65) Prior Publication Data

US 2011/0140661 A1 Jun. 16, 2011

(30) Foreign Application Priority Data

Dec. 16, 2009 (KR) .................. 10-2009-0125306

(51) Int. Cl.
*H02J 7/00* (2006.01)

(52) U.S. Cl.
USPC .......................................... 320/114; 320/137

(58) Field of Classification Search
USPC ................................................ 320/114
See application file for complete search history.

(56) References Cited

U.S. PATENT DOCUMENTS

2007/0285056 A1* 12/2007 Yoon et al. ............. 320/116
2008/0252256 A1* 10/2008 Parker et al. ............ 320/114

* cited by examiner

*Primary Examiner* — Arun Williams
(74) *Attorney, Agent, or Firm* — Jefferson IP Law, LLP

(57) ABSTRACT

A device and method for controlling the charging of a portable terminal is provided. The device includes an external power supply interface unit for supplying an external power, a battery interface unit to which a main battery and a sub battery are connected, and a charging controller for controlling a charge of the main battery or a simultaneous charge of the main battery and the sub battery.

12 Claims, 5 Drawing Sheets

METHOD AND APPARATUS FOR CONTROLLING BATTERY CHARGING OF PORTABLE DEVICE

PRIORITY

This application claims the benefit under 35 U.S.C. §119(a) of a Korean patent application filed on Dec. 16, 2009 in the Korean Intellectual Property Office and assigned Serial No. 10-2009-0125306, the entire disclosure of which is hereby incorporated by reference.

BACKGROUND OF THE INVENTION

1. Field of the Invention

The present invention relates to a battery charge control method and charge control device of a portable terminal. More particularly, the present invention relates to a battery charge control method and charge control device for simultaneously charging a plurality of batteries in a slide type portable terminal.

2. Description of the Related Art

A portable terminal has become widely used due to an increase of a diffusion rate. The portable terminal can provide not only voice call service but also various data transmission services and various additional services such that the portable terminal can function as a multimedia communications device. Recently, the use of the portable terminal has increased based on its improved portability. More particularly, as the size of the portable terminal decreases while the capacity of battery is maintained, the portability of the portable terminal increases. Moreover, a portable terminal user usually transports a charged sub battery to assist a main battery mounted within a terminal. However, it has the problem in that a Battery Charger (BTC) which is a charging apparatus for electrically charging the sub battery is separately required in order to use the sub battery, thus maximizing the portability of portable terminal.

Therefore, a need exists for a method and an apparatus for conveniently using a sub battery in a portable terminal.

SUMMARY OF THE INVENTION

An aspect of the present invention is to address the above mentioned problems and/or disadvantages and to provide at least the advantages described below. Accordingly, an aspect of the present invention is to provide a battery charge control method and a battery charge control device of a portable terminal which can simultaneously charge a main battery and a sub battery of a portable terminal with electricity without the preparation of a separate charging apparatus for the sub battery.

In accordance with an aspect of the present invention, a charging control method of a portable terminal is provided. The charging control method includes supplying an external power supply, determining whether a main battery is electrically connected to the portable terminal in a main battery connection process, determining whether a sub battery is electrically connected to the portable terminal when the main battery is connected in a main battery and sub battery connection process, and controlling to simultaneously charge the main battery and the sub battery.

In accordance with another aspect of the present invention, a charging control device of a portable terminal is provided. The charging control device includes an external power supply interface unit for supplying an external power, a battery interface unit to which a main battery and a sub battery are connected, and a charging controller for controlling a charge of the main battery or a simultaneous charge of the main battery and the sub battery.

In the battery charge control method and charge control device of the portable terminal according to an exemplary embodiment of the present invention, the main battery and the sub battery may be simultaneously charged only by the portable terminal in a situation where the Battery Charger (BTC) which is a charging apparatus for charging the sub battery does not exist. Accordingly, exemplary embodiments of the present invention provide an apparatus and method for eliminating a restriction that the BTC is necessary in order to use the sub battery.

BRIEF DESCRIPTION OF THE DRAWINGS

The above and other aspects, features, and advantages of certain exemplary embodiments of the present invention will be more apparent from the following description in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
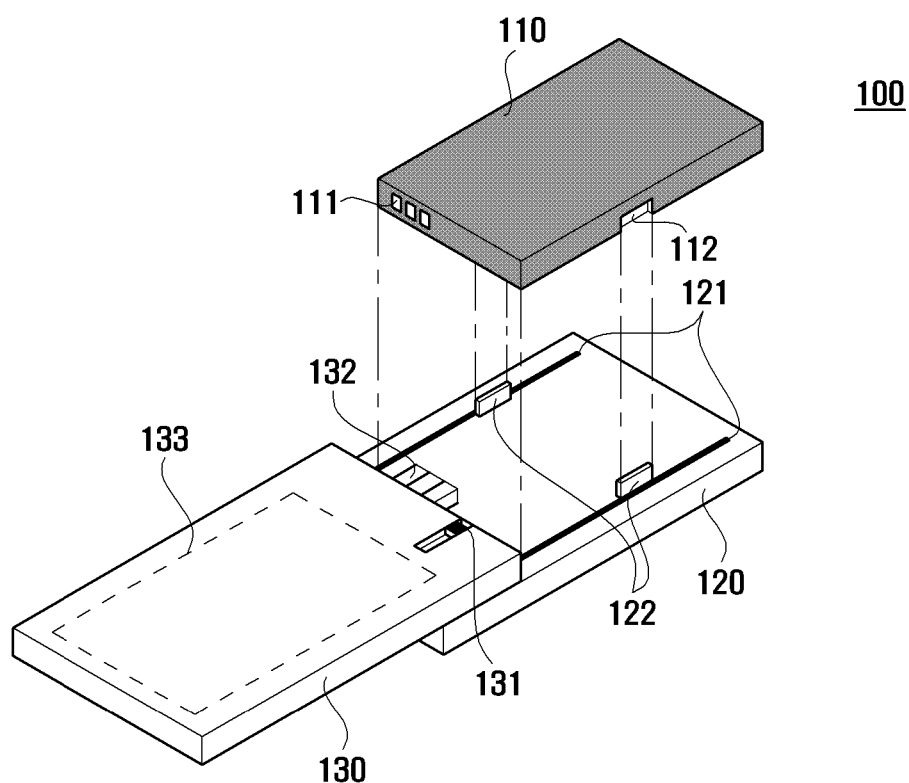
FIG. 1A and FIG. 1B are diagrams illustrating a shape of a slide type portable terminal and a combination of a sub battery for charging according to an exemplary embodiment of the present invention.
Figure 1B:
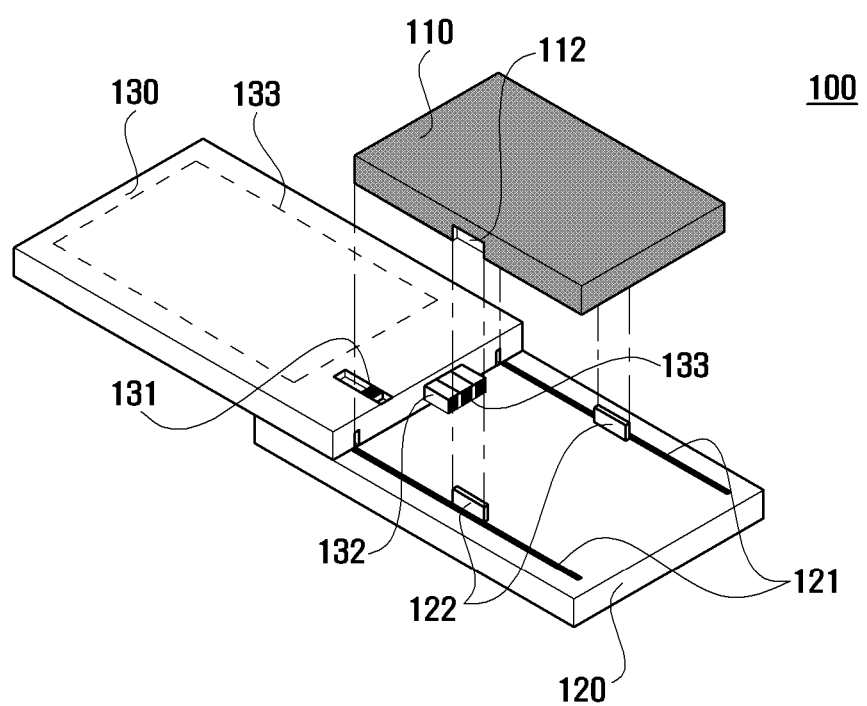

FIG. 1A and FIG. 1B are diagrams illustrating a shape of a slide type portable terminal and a combination of a sub battery for charging according to an exemplary embodiment of the present invention.

Referring to FIG. 1A and FIG. 1B, the portable terminal 100 is a terminal adopting a sliding-type. The portable terminal 100 includes a main battery 133, a lower slider 130 including a cover covering the main battery 133, and an upper slider 120 which performs a slide action in a specific direction while adhering closely with the lower slider 130. Here, when the portable terminal 100 of the slide type is in a slide open state, a sub battery 110 may be combined with the rear side of the upper slider 120. To do this, the sub battery 110 may have a groove 112 for fixing in the side. The upper slider 120 may have a protrusion 122 for fixing which has the same size and interval as the groove 112 for form fixing in the sub battery 110 between two sliding grooves 121 formed in the rear side of upper slider 120. In the meantime, the lower slider 130 may have a sub battery connector 132 for the electrical connection with the sub battery 110. Moreover, the lower slider 130 may have a knob 131 which may move the sub battery connector 132. The sub battery connector 132 may be protruded outside of one side of the lower slider 130 according to an operation of the knob 131 by a user in a specific direction, or may be accepted in the inside of the lower slider 130 according to an operation in the opposite direction. If the user of the portable terminal 100 fits the protrusion 122 for form fixing in the upper slider 120 into the groove 112 for form fixing in the sub battery 110 so that the sub battery 110 might be united with the rear side of the upper slider 120, and manipulates the knob 131 in the direction of the upper slider 120, the sub battery connector 132 may be protruded outside of one side of the lower slider 130. At this time, the electrical connection terminal 133 of the sub battery connector 132 protruded outside has contact with the electrical connection terminal 111 of the sub battery 110. Thus, the electrical connection results between the sub battery 110 and the portable terminal 100. Here, in order to fix the sub battery 110 to the rear side of the upper slider 120, two grooves 112 for form fixing in both sides of the sub battery 110, respectively, and the protrusion 122 for form fixing in the rear side of the upper slider 120 while having the same size and interval as the groove 112 for fixing is illustrated as an example. However, the present invention is not limited thereto. For example, in order to solidly fix the sub battery 110 to the rear side of the upper slider 120, a plurality of grooves 112 for fixing may be formed in the sub battery 110 and the protrusion 122 for fixing may be formed in the upper slider 120.

Figure 2A:
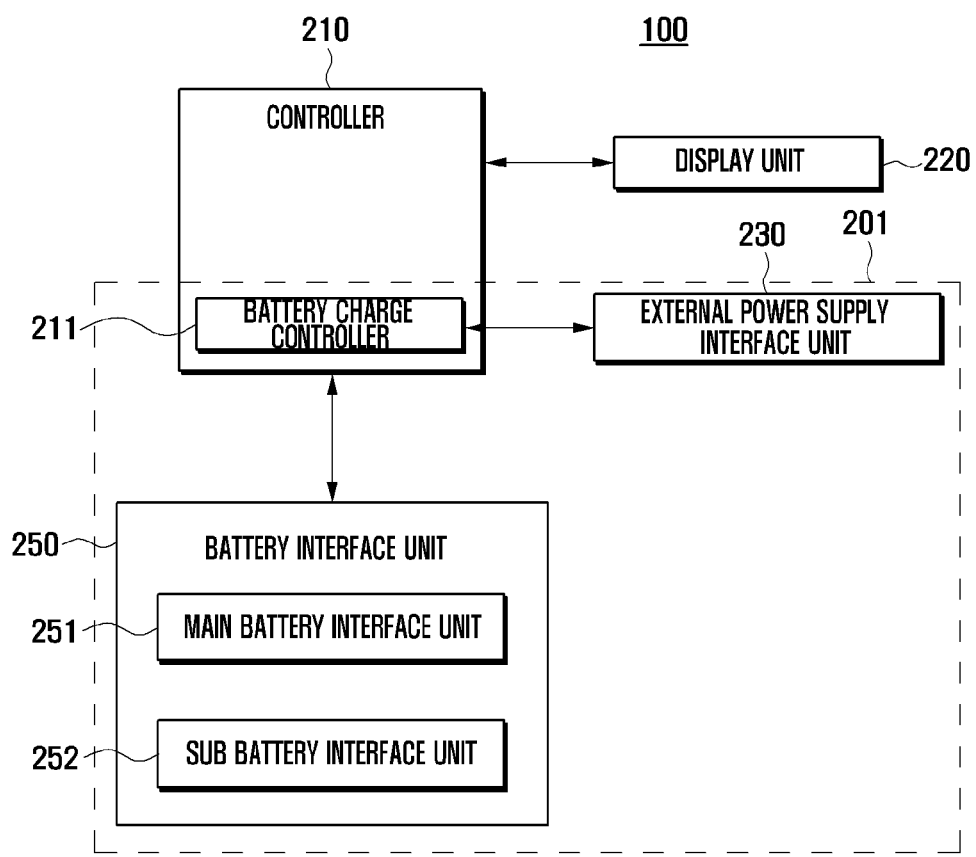
FIG. 2A is a block diagram illustrating a schematic configuration of a portable terminal according to an exemplary embodiment of the present invention.

FIG. 2A is a block diagram illustrating a schematic configuration of a portable terminal according to an exemplary embodiment of the present invention.

Referring to FIG. 2A, the portable terminal 100 includes a display unit 220, an external power supply interface unit 230, a battery interface unit 250, and a controller 210. The external power supply interface unit 230 is provided with power from an external power source such as a Traveler Adapter (TA) and supplies charging current to a battery combined with the battery interface unit 250 under the control of the controller 210 such that the portable terminal 100 having the above described configuration may charge the battery with electricity. A configuration and function of the portable terminal 100 is described below.

The display unit 220 may output a screen activated by an operation of the portable terminal 100. For example, the display unit 220 performs the function of outputting a booting screen, a stand-by screen, and a call screen and other application execution screens of the portable terminal 100. That is, the display unit 220 may display various screens related to a state and an operation of the portable terminal 100.

A Liquid Crystal Display (LCD) or an Organic Light Emitting Diode (OLED) may be applied to the display unit 220. More particularly, in a case where the main battery 133 is not combined with the portable terminal 100, the display unit 220 may output a message informing that the main battery 133 and the portable terminal 100 are not combined. When the TA is combined for the charge of the main battery 133 in a state when the main battery 133 is not combined with the portable terminal 100, a pop-up window displaying a text "Please connect the main battery" may be displayed on a screen display window by using power which is supplied by the TA. The pop up window may be output when the main battery 133 is not connected although a sub battery 110 is connected. The external power supply interface unit 230 provides a physical interface between an external power source, e.g., the Traveler Adapter (TA) and the portable terminal 100. Moreover, after the external power supply interface unit 230 is provided with power from the external power source through the physical interface and generates a charging current, the external power supply interface unit 230 supplies the charging current to the battery interface unit 250. That is, the external power supply interface unit 230 may charge the batteries 133, 110 by generating the charging current based on the power which is provided from the external power supply, e.g., the TA and supplying the charging current to the batteries 133,110 of the portable terminal 100.

In an exemplary implementation, the external power supply interface unit 230 may control the charging current under the control of the controller 210. That is, when only a single main battery 133 is connected, the external power supply interface unit 230 may generate a charging current for charging the main battery 133. When both the main battery 133 and the sub battery 110 are connected, a charging current for simultaneously charging the main battery 133 and the sub battery 110 may be generated.

The battery interface unit 250 provides a physical interface between the main battery 133 and the sub battery 110 and the portable terminal 100. To provide the physical interface, the battery interface unit 250 includes a main battery interface unit 251 and a sub battery interface unit 252. The main battery interface unit 251 provides the physical interface between the portable terminal 100 and the main battery 133, and thus, may supply the power that the main battery 133 stores to the portable terminal 100 or may supply the charging current provided by the external power supply interface unit 230 to the main battery 133 such that the main battery 133 may be charged.

The main battery interface unit 251 may include a settling portion formed by an intaglio in one side of the lower slider 130 to settle the main battery 133, and a main battery connector which includes electrodes which may electrically connect to a connection terminal of the settled main battery 133. The sub battery interface unit 252 provides the physical interface between the portable terminal 100 and the sub battery 110, and thus, supplies the charging current supplied by the external power supply interface unit 230 to the sub battery 110 such that the sub battery 110 may be charged. Moreover, when the sub battery 110 is not combined with the portable terminal 100, the sub battery interface unit 252 may block the charging current supplied from the external power supply interface unit 230 to the sub battery 110 under the control of a battery charge controller 211.

The sub battery interface unit 252 may include, as illustrated in FIG. 1A and FIG. 1B, a sub battery settling portion formed in the rear side of the upper slider 120, and a sub battery connector 132 including electrodes electrically connected to the connection terminal of the sub battery according to a user operation after the sub battery 110 is settled in the sub battery settling portion. The battery interface unit 250 may further include a switch for the control of sub battery 110, e.g., a protection Field Effect Transmitter (FET) 253. The protection FET 253 is turned-on or turned-off under the control of the controller 210 so that it may transmit or block the power supplied by the TA to the sub battery 110.

The controller 210 controls the power supply for each configuration, and performs an overall control function for the operation of the portable terminal 100. Moreover, the controller 210 may control the signal flow between each configuration within the portable terminal 100. That is, the controller 210 may control the signal flow between each configuration of the portable terminal 100 such as the external power supply interface unit 230 and the battery interface unit 250. More particularly, the controller 210 may control the external power supply interface unit 230 and the battery interface unit 250 to simultaneously charge a plurality of batteries. The controller 210 may include the battery charge controller 211 as an element. The battery charge controller 211 controls the external power supply interface unit 230 and the battery interface unit 250 to be provided with power from the external power source such that the battery of the portable terminal 100 may be charged with electricity.

The battery charge controller 211 may grasp whether the main battery 133 is combined and the sub battery 110 is combined, and may control the charging current of the external power supply interface unit 230 based on grasped battery combination information. Moreover, when the sub battery 110 is not combined, the battery charge controller 211 may control the battery interface unit 250 to block the charging current supplied from the external power supply interface unit 230 to the sub battery 110. Moreover, when the main battery 133 is not combined with the portable terminal 100 and only the sub battery 110 is combined with the portable terminal 100, the battery charge controller 211 may control to block the supply of charging current for the charge of the sub battery 110. In the meantime, a charge control device 201 of the portable terminal 100 may be configured by combining the battery charge controller 211, the external power supply interface unit 230, and the battery interface unit 250 as one unit.

Figure 2B:
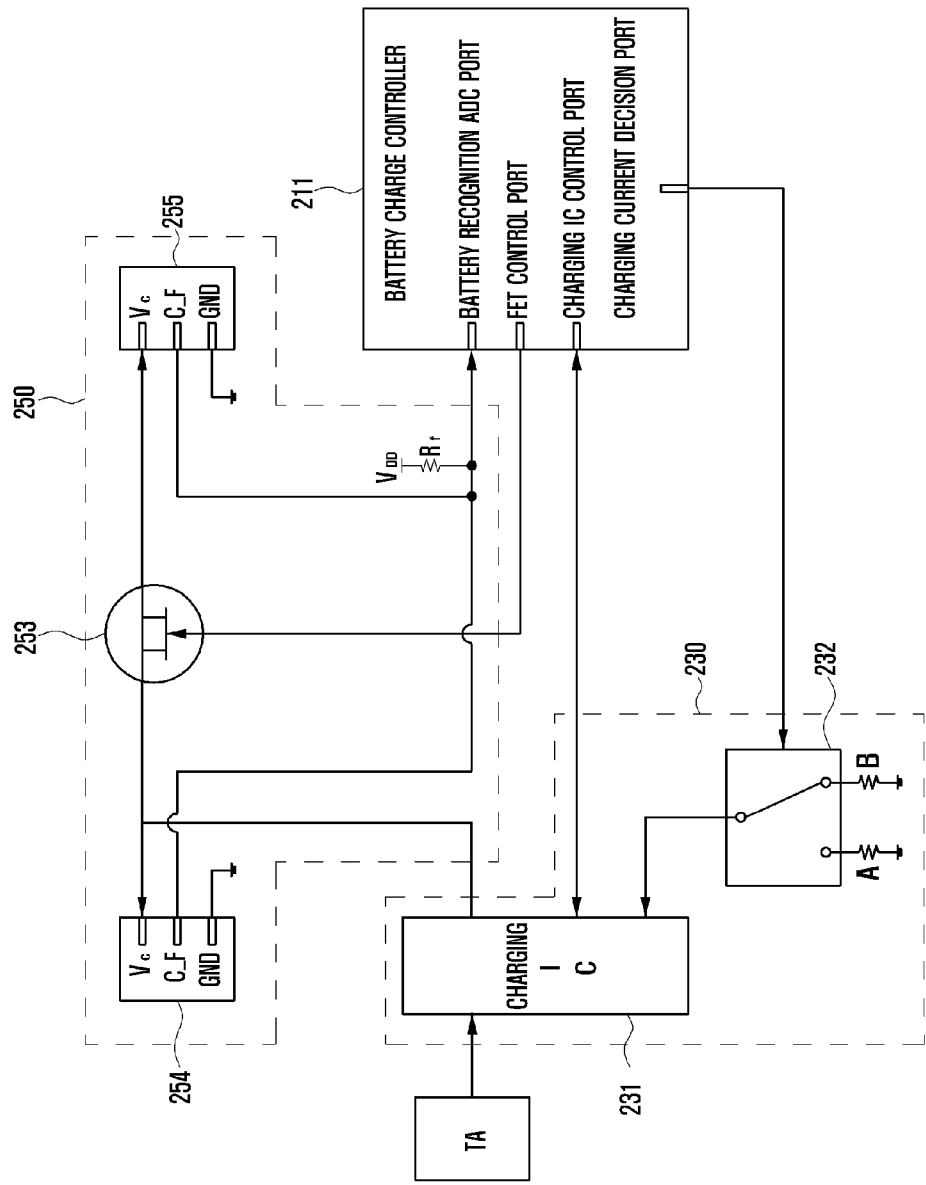
FIG. 2B is a circuit diagram of a charge control device of portable terminal according to an exemplary embodiment of the present invention.

FIG. 2B is a circuit diagram illustrating a charge control device of a portable terminal according to an exemplary embodiment of the present invention.

Referring to FIG. 2B, the charge control device 201 includes a battery interface unit 250, an external power supply interface unit 230, and a battery charge controller 211. The battery interface unit 250 may include a main battery connector 254 corresponding to the main battery interface unit 251, a sub battery connector 255 corresponding to the sub battery interface unit 252, and a protection FET 253. The main battery connector 254 provides a physical interface between the portable terminal 100 and the main battery 133 combined with the portable terminal 100.

Three terminals including a Vc terminal, a C_F terminal, and a GND terminal may be formed in the main battery connector 254. The Vc terminal of the main battery connector 254 may charge the main battery 133 by supplying the charging current supplied by the external power supply interface unit 230 to the main battery 133. The C_F terminal of the main battery connector 254 is a terminal connected to an internal resistance of the main battery 133. The battery charge controller 211 may detect the distribution voltage caused by the internal resistance of the main battery 133 through the C_F terminal. The GND terminal of the main battery connector 254 may be an earth terminal.

Moreover, the sub battery connector 255 is a connector providing physical interface between the portable terminal 100 and the sub battery 110 combined with the portable terminal 100, and may form three terminals including the Vc terminal, the C_F terminal, and the GND similarly to the main battery connector 254. The function of the Vc terminal, the C_F terminal, and the GND terminal which the sub battery connector 255 includes is the same as the Vc terminal, the C_F terminal, and the GND terminal of the main battery connector 254.

When the sub battery 110 is not combined with the portable terminal 100, the protection FET 253 blocks the charging current supplied from the external power supply interface unit 230 to the sub battery connector 255 under the control of the battery charge controller 211. The blocking of the charging current prevents a safety accident which may be generated when current is supplied to the sub battery connector 255 that is protruded to outside.

The protection FET 253 may have an off-state and an on-state under the control of the battery charge controller 211. The off-state is a state for blocking the current path between the external power supply interface unit 230 and the sub battery connector 255, and the on-state may correspond to the state for connecting the current path between the external power supply interface unit 230 and the sub battery connector 255.

The external power supply interface unit 230 may include a charging Integrated Circuit (IC) 231 and a charging current decision switch 232. The charging IC 231 is provided with power from the external power source, e.g., the TA and generates a charging current, so that the charging IC 231 may supply the charging current to the main battery connector 254 and the sub battery connector 255 under the control of the battery charge controller 211. At this time, the charging IC 231 may adjust the intensity of the charging current according to an operation of the charging current decision switch 232. Moreover, the charging IC 231 may transmit a signal including supply state information of the charging current to the battery charge controller 211.

That is, when the charging current is supplied to the main battery connector 254 and the sub battery connector 255, the charging IC 231 may recognize this and transmit a signal informing the battery charge controller 211 that the supply of the charging current is progressed. When the protection FET 253 is in the off-state or when the sub battery 110 is not combined with the portable terminal 100 while the main battery 133 is also not combined with the portable terminal 100, the flow of the charging current is stopped. At this time, the charging IC 231 may transmit a signal which informs the battery charge controller 211 that the flow of the charging current is stopped.

The charging current decision switch 232 may include a resistance A and a resistance B, which are connected between the charging IC 231 and ground, having a different resistance value respectively. The resistance A according to an exemplary embodiment of the present invention has a resistance value which enables the charging IC 231 to generate a charging current for charging one battery. Moreover, the resistance B has a resistance value which enables the charging IC 231 to generate a charging current for simultaneously charging the main battery 133 and the sub battery 110. The charging current decision switch 232 enables only one of the resistance A and the resistance B to connect with the charging IC 231 under the control of the battery charge controller 211, so that the charging IC 231 may adjust the intensity of the charging current supplied to the main battery connector 254 and the sub battery connector 255.

The battery charge controller 211 may include a battery recognition Analog Digital Conversion (ADC) port, a FET control port, a charging IC control port and a charging current decision port. The battery recognition ADC port is an analog-digital conversion port which may measure the voltage connected to the port to convert into a digital signal. The battery recognition ADC port may be connected to the C_F terminal of the main battery connector 254 and the C_F terminal of the sub battery connector 255, and may be connected to a reference voltage Vdd through Rf resistance. Through the battery recognition ADC port, the battery charge controller 211 may grasp whether the main battery 133 and the sub battery 110 are combined with the portable terminal 100.

That is, the battery recognition ADC port may measure a reference voltage Vdd through an Rf resistance when both the main battery 133 and the sub battery 110 are not combined with the portable terminal 100. At this time, when the main battery 133 is combined, the reference voltage Vdd is connected to the ground (GND) through the Rf resistance and an internal resistance of the main battery 133. Accordingly, the battery recognition ADC port connected between the Rf resistance and the internal resistance of the main battery 133 may measure a distribution voltage V1 of the internal resistance of the main battery 133. When the sub battery 110 is combined in a state where the main battery 133 is combined, the reference voltage Vdd is connected to the ground GND through the Rf resistance and a parallel synthesis resistance of the internal resistances of the main battery 133 and the sub battery 110. Thus, the battery recognition ADC port connected between the Rf resistance and the parallel synthesis resistance of the internal resistances of the main battery 133 and the sub battery 110 may measure the distribution voltage V2 of the parallel synthesis resistance.

Accordingly, the battery charge controller 211 may recognize that both the main battery 133 and the sub battery 110 are not combined when the battery recognition ADC port measures the reference voltage Vdd, may recognize that the main battery 133 is combined when the battery recognition ADC port measures the distribution voltage V1, and may recognize that both the main battery 133 and the sub battery 110 are combined when the battery recognition ADC port measures a distribution voltage V2.

The FET control port may be connected to the protection FET 253 of the battery interface unit 250. The battery charge controller 211 controls the protection FET 253 through the FET control port and may connect or block the charging current supplied from the charging IC 231 to the sub battery connector 255. That is, when the battery recognition ADC port measures the reference voltage Vdd or the distribution voltage V1, the battery charge controller 211 may control the protection FET 253 to block the charging current supplied from the charging IC 231 to the sub battery connector 255 through the FET control port.

Moreover, when the battery recognition ADC port measures the distribution voltage V2, the battery charge controller 211 may control the protection FET 253 to flow the charging current supplied from the charging IC 231 to the sub battery connector 255 through the FET control port. The charging current decision port may be connected to the charging current decision switch 232. The battery charge controller 211 may control the charging current decision switch 232 so that one of the resistance A or the resistance B may be connected with the charging IC 231 through the charging current decision port.

That is, when the battery recognition ADC port measures the distribution voltage V1, the battery charge controller 211 controls the charging current decision switch 232 through the charging current decision port to connect the resistance A to the charging IC 231 so that the charging IC 231 may generate a charging current for charging one battery. When the battery recognition ADC port measures the distribution voltage V2, the battery charge controller 211 controls the charging current decision switch 232 through the charging current decision port to connect the resistance B with the charging IC 231 so that the charging IC 231 generates a charging current for simultaneously charging the main battery 133 and the sub battery 110.

The charging IC control port may be connected to the charging IC 231. When an external power source, e.g., the TA is combined with the charging IC 231, the battery charge controller 211 may recognize the connection through the charging IC control port. Moreover, the battery charge controller 211 may control the charging IC 231 to generate a charging current or not to generate a charging current through the charging IC control port. That is, when the battery recognition ADC port measures the distribution voltage V1 or the distribution voltage V2 and the external power source is combined with the charging IC 231, the battery charge controller 211 may control to generate the charging current by activating the charging IC 231 through the charging IC control port. When the battery recognition ADC port measures the reference voltage Vdd or the external power source is not combined with the charging IC 231, the battery charge controller 211 may control to not generate a charging current by deactivating the charging IC 231 through the charging IC control port. As described above, the configuration and role of the portable terminal 100 according to an exemplary embodiment of the present invention is described with reference to FIGS. 1A to 2B. Hereinafter, an operating method of the portable terminal 100 according to an exemplary embodiment of the present invention will be described.

Figure 3:
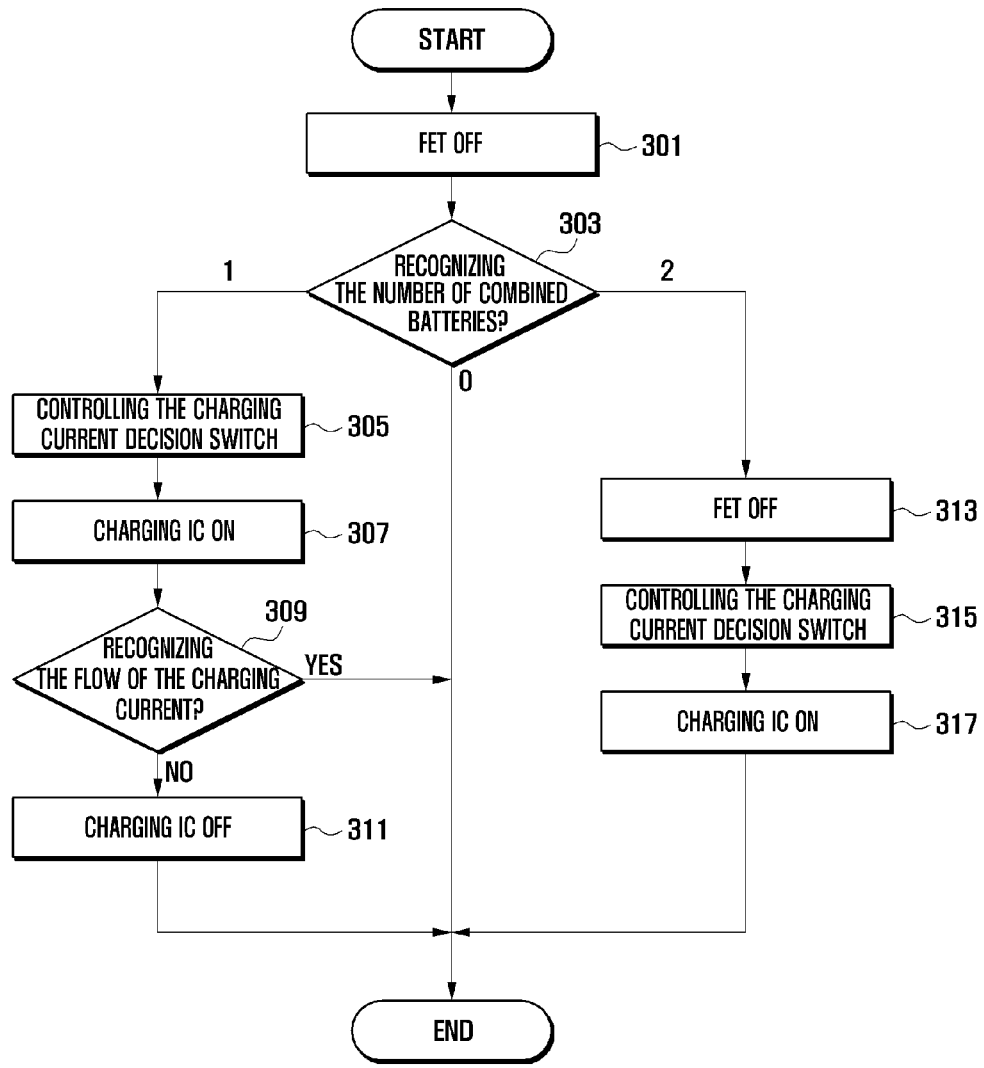
FIG. 3 is a flowchart illustrating an operation method of a charge control device according to an exemplary embodiment of the present invention.

FIG. 3 is a flowchart illustrating an operation method of a charge control device according to an exemplary embodiment of the present invention.

Referring to FIGS. 2B and 3, the battery charge controller 211 controls the protection FET 253 of the battery interface unit 250 to be turned-off so that the protection FET 253 may be in an off-state in step 301. The off-state protection FET 253 blocks the current path between the charging IC 231 of the external power supply interface unit 230 and the sub battery connector 255 of the battery interface unit 250 so that it may block the charging current which the charging IC 231 supplies to the sub battery connector 255. Hence, it is possible to prevent a safety accident which may be generated when the charging current is supplied to the sub battery connector 255 that may be protruded outside according to an operation of a user. The battery charge controller 211 may recognize the number of batteries combined with the battery interface unit 250 through the battery recognition ADC port in step 303.

That is, when the battery recognition ADC port measures the reference voltage Vdd, the battery charge controller 211 may recognize that both the main battery 133 and the sub battery 110 are not combined, may recognize that one of the main battery 133 and the sub battery 110 is combined when the battery recognition ADC port measures the distribution voltage V1, and may recognize that both the main battery 133 and the sub battery 110 are combined when the battery recognition ADC port measures the distribution voltage V2. The battery charge controller 211 may proceed to step 305 when the number of batteries combined with the battery interface units 250 is one. The battery charge controller 211 may proceed to step 313 when the number of batteries combined with the battery interface units 250 is two. The battery charge controller 211 ends the process when both the main battery 133 and the sub battery 110 are not combined with the battery interface unit 250. The battery charge controller 211 may control the charging current decision switch 232 through the charging current decision port so that the charging current decision switch 232 connects the resistance A with the charging IC 231 in step 305.

In an exemplary embodiment of the present invention, the resistance A may have a resistance value which enables the charging IC 231 to generate a charging current for charging one battery. The battery charge controller 211 may activate the charging IC 231 and control the charging IC 231 to supply the charging current to the Vc terminal of the main battery connector 254 after the charging IC 231 is provided with the power source from a TA and generates the charging current in step 307.

Since the charging current decision switch 232 connects the resistance A with the charging IC 231, the charging IC 231 generates the charging current for charging one battery and may supply the charging current to the Vc terminal of the main battery connector 254. The battery charge controller 211 may recognize the supply state of the charging current based on a signal that the charging IC 231 transmits to the battery charge controller 211 in step 309.

That is, when the charging IC 231 transmits a signal which informs that the supply of the charging current is progressed, the battery charge controller 211 may recognize that the charging current is supplied to the battery interface unit 250. On the other hand, when the charging IC 231 transmits a signal which informs that the supply of the charging current is stopped, the battery charge controller 211 may recognize that the charging current is not supplied to the battery interface unit 250. Since the protection FET 253 is in an off-state in step 309, the charging current supplied by the charging IC 231 is supplied only to the Vc terminal of the main battery connector 254.

If the charging current is unable to flow, then the main battery 133 is not combined with the main battery connector 254. Accordingly, the battery charge controller 211 may recognize that the one battery combined with the portable terminal 100 is the sub battery 110. The battery charge controller 211 ends the process when the charging current is supplied to the battery interface unit 250. On the other hand, when the charging current is not supplied to the battery interface unit 250, the battery charge controller 211 may proceed to step 311. The battery charge controller 211 may deactivate the charging IC 231 in step 311. That is, the battery charge controller 211 may control the charging IC 231 so that the charging IC 231 may not supply the charging current to the Vc terminal of the main battery connector 254. At this time, the battery charge controller 211 may control the display unit 220 to display a pop-up window displaying a text "please connect main battery" to a screen display window by using power supplied by the TA.

The battery charge controller 211 controls the protection FET 253 of the interface unit 250 to be turned-on so that the protection FET 253 is in an on-state in step 313. The on-state protection FET 253 connects the current path between the charging IC 231 of the external power supply interface unit 230 and the sub battery connector 255 of the battery interface unit 250 so that it may transmit the charging current that the charging IC 231 supplies to the sub battery connector 255. Then, the battery charge controller 211 may control the charging current decision switch 232 so that the charging current decision switch 232 may connect the resistance B to the charging IC 231 through the charging current decision port in step 315. In an exemplary embodiment of the present invention, the resistance B has a resistance value which enables the charging IC 231 to generate a charging current for charging two batteries. The battery charge controller 211 activates the charging IC 231 and may control the charging IC 231 so that the charging IC 231 may supply the charging current to the Vc terminal of the main battery connector 254 and the Vc terminal of the sub battery connector 255 after being provided with power from the TA and generating the charging current in step 317.

Since the charging current decision switch 232 connects the resistance B to the charging IC 231, the charging IC 231 generates a charging current for charging two batteries and may supply the charging current to the Vc terminal of the main battery connector 254 and the Vc terminal of the sub battery connector 255. As described above, the battery charging control method of the portable terminal 100 according to an exemplary embodiment of the present invention may determine whether the sub battery 110 is combined with the portable terminal 100, and may supply the charging current to the sub battery connector 255 only when the sub battery 110 is combined. Moreover, when the sub battery 110 is combined, the above described control method generates a charging current for charging two batteries and may supply the charging current to the main battery 133 and the sub battery 110. That is, the main battery 133 of the portable terminal 100 and the sub battery 110 may be simultaneously charged. Accordingly, the necessity of the Battery Charger (BTC) for charging the sub battery 100 is eliminated.

While the invention has been shown and described with reference to certain exemplary embodiments thereof, it will be understood by those skilled in the art that various changes in form and detail may be made therein without departing from the spirit and scope of the invention as defined by the appended claims and their equivalents.

What is claimed is:

1. A charging control device of a portable terminal, the device comprising:
    an external power supply interface unit for supplying an external power;
    a battery interface unit to which a main battery and a sub battery are connected; and
    a charging controller for controlling at least one of a charge of the main battery and a simultaneous charge of the main battery and the sub battery,
    wherein the battery interface unit comprises:
        a lower slider comprising a settling portion in which the main battery is settled and a main battery interface unit electrically connected with the main battery;
        an upper slider comprising a sub battery settling portion that slides on the lower slider and settles the sub battery according to a slide state; and
        a sub battery interface unit prepared in one side of the lower slider and electrically connected with the sub battery.

2. The device of claim 1, wherein the battery interface unit comprises:
    a protection Field Effect Transmitter (FET) which is disposed between the external power supply interface unit and the sub battery interface unit, and at least one of turned-on and turned-off according to control of the charging controller.

3. The device of claim 2, wherein the charging controller controls the protection FET to be turned-off when the sub battery is not settled, and controls the protection FET to be turned-on when the main battery and the sub battery are simultaneously settled.

4. The device of claim 1, wherein the upper slider comprises at least one protrusion for fixing which is connected to a groove formed in the sub battery when the sub battery is settled to fix the sub battery.

5. The device of claim 1, wherein the sub battery interface unit comprises:
   a connector which is protruded to outside in one side of the lower slider by power delivered from outside in a specific direction, accepted in the lower slider by power delivered to the opposite direction; and
   a knob to which the power is delivered while being connected to the connector.

6. The device of claim 1, wherein the external power supply interface unit comprises:
   a charging IC which supplies a charging current to the main battery interface and the sub battery interface according to a control of the charging controller; and
   a charging current decision switch which controls a charging current corresponding to the charge of the main battery or the simultaneous charge of the main battery and the sub battery.

7. A charging control method of a portable terminal, the method comprising:
   supplying an external power supply;
   determining whether a main battery is electrically connected to the portable terminal;
   determining whether a sub battery is electrically connected to the portable terminal when the main battery is connected; and
   controlling to simultaneously charge the main battery and the sub battery,
   wherein the main battery and the sub battery connection process comprises:
      settling the main battery in a main battery settling portion prepared in a lower slider;
      settling the sub battery in one side of an upper slider; and
      moving a sub battery interface unit accepted in the lower slider after the sub battery is settled to electrically connect to an electrode of the sub battery.

8. The method of claim 7, further comprising:
outputting a message requesting a connection of the main battery when the main battery is not connected in the main battery connection process.

9. The method of claim 7, further comprising:
forming a charging current pass for simultaneous charging when the main battery and the sub battery are simultaneously connected.

10. The method of claim 7, further comprising:
blocking an electrical connection between an interface unit for the connection of the sub battery and the external power supply interface unit when the sub battery is not connected in the main battery and sub battery connection process.

11. The method of claim 7, further comprising:
controlling a protection Field Effect Transmitter (FET) to be turned-off when the sub battery is not settled.

12. The method of claim 11, further comprising:
controlling the protection FET to be turned-on when the main battery and the sub battery are simultaneously settled.

* * * * *